US009219261B2

(12) United States Patent
Kim

(10) Patent No.: US 9,219,261 B2
(45) Date of Patent: Dec. 22, 2015

(54) BATTERY PACK

(71) Applicants: SAMSUNG SDI CO., LTD., Yongin-si, Gyeonggi-do (KR); ROBERT BOSCH GMBH, Stuttgart (DE)

(72) Inventor: Dukjung Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/670,341

(22) Filed: Nov. 6, 2012

(65) Prior Publication Data

US 2013/0280574 A1    Oct. 24, 2013

(30) Foreign Application Priority Data

Apr. 19, 2012  (KR) .................. 10-2012-0041112

(51) Int. Cl.
*H01M 10/60* (2014.01)
*H01M 2/10* (2006.01)
(Continued)

(52) U.S. Cl.
CPC ............ *H01M 2/1077* (2013.01); *H01M 2/206* (2013.01); *H01M 2/305* (2013.01); *H01M 10/613* (2015.04); *H01M 10/6552* (2015.04); *H01M 10/6553* (2015.04); *B60L 11/1874* (2013.01); *H01M 10/625* (2015.04); *H01M 10/647* (2015.04); *H01M 10/6556* (2015.04); *H01M 2220/20* (2013.01); *Y02T 10/7005* (2013.01)

(58) Field of Classification Search
None
See application file for complete search history.

(56) References Cited

U.S. PATENT DOCUMENTS

| | | | | |
|---|---|---|---|---|
| 4,600,665 A | * | 7/1986 | Sanders | 429/120 |
| 6,512,347 B1 | * | 1/2003 | Hellmann et al. | 320/107 |
| 2009/0286146 A1 | * | 11/2009 | Hansson et al. | 429/121 |

(Continued)

FOREIGN PATENT DOCUMENTS

| | | |
|---|---|---|
| EP | 0 930661 A2 | 7/1999 |
| GB | 2 068 633 A | 8/1981 |

(Continued)

OTHER PUBLICATIONS (Fukui et al., Cell cooling system, JP 2011029103, Machine English translation, Pub Date—Feb. 10, 2011, Priority Date—Jul. 29, 2009 (JP 2009-176071).*

(Continued)

*Primary Examiner* — Patrick Ryan
*Assistant Examiner* — Jose Colucci Rios
(74) *Attorney, Agent, or Firm* — Christie, Parker & Hale, LLP

(57) ABSTRACT

A battery pack including: a plurality of secondary batteries, each including an electrode terminal having a cooling groove; a cooling pipe configured to pass a heat transfer medium therethrough, the cooling pipe being received in the cooling groove of each of the plurality of secondary batteries; and a bus bar electrically connecting the electrode terminals of adjacent secondary batteries of the plurality of secondary batteries.

16 Claims, 5 Drawing Sheets

(51) Int. Cl.
  *H01M 2/20*       (2006.01)
  *H01M 2/30*       (2006.01)
  *H01M 10/6553*    (2014.01)
  *H01M 10/6552*    (2014.01)
  *H01M 10/613*     (2014.01)
  *B60L 11/18*      (2006.01)
  *H01M 10/625*     (2014.01)
  *H01M 10/647*     (2014.01)
  *H01M 10/6556*    (2014.01)

(56) References Cited

U.S. PATENT DOCUMENTS

2011/0020686 A1* 1/2011 Yamamoto et al. ............ 429/120
2011/0151305 A1* 6/2011 Bolze et al. .................. 429/120
2011/0244298 A1* 10/2011 Guener et al. ................. 429/120
2012/0009457 A1* 1/2012 Lee et al. ....................... 429/120

FOREIGN PATENT DOCUMENTS

JP    2009-245730 A    10/2009
JP    2010-212155 A    9/2010
JP    2011-029103 A    2/2011

OTHER PUBLICATIONS

Fukui et al., Cell cooling system, JP 2011029103, Machine English translation, Pub Date—Feb. 10, 2011, Priority Date—Jul. 29, 2009 (JP 2009-176071).*

European Search Report dated Jul. 23, 2013, for European Application 13152128.8, 4 pages.

* cited by examiner

BATTERY PACK

CROSS-REFERENCE TO RELATED APPLICATION

This application claims priority to and the benefit of Korean Patent Application No. 10-2012-0041112, filed on Apr. 19, 2012 in the Korean intellectual Property Office, the entire content of which is incorporated herein by reference.

BACKGROUND

1. Field

Aspects of embodiments of the present invention relate to a battery pack.

2. Description of the Related Art

Generally, secondary batteries may be charged and discharged. One secondary battery is typically used in small portable devices such as cellular phones, notebooks, computers, cameras, and camcorders. Also, a battery pack including a plurality of secondary batteries connected to each other is mainly used as a power source for driving a motor, such as a motor of a high-output hybrid electric vehicle (HEV) or an electric vehicle (EV).

Since secondary batteries that are several or several tens of unit cells are connected to each other to constitute one battery pack, a cooling structure, a safety unit, and a system circuit which are configured to easily dissipate heat generated in the battery pack may be provided. In particular, since high-output, high-capacity battery packs for HEVs and EVs demand high output, battery packs having improved thermal performance for dissipating large amounts of heat are required.

SUMMARY

According to an aspect of embodiments of the present invention, a battery pack includes a cooling pipe received in an electrode terminal to directly cool the electrode terminal, thereby improving thermal performance when a high-capacity reaction occurs.

According to another aspect of embodiments of the present invention, a battery pack includes a cooling pipe received in an electrode terminal to directly cool the electrode terminal, thereby reducing thermal deformation and improving durability.

As such, a rechargeable battery according to embodiments of the present invention is suited for application in an electric vehicle or a hybrid electric vehicle.

According to an embodiment of the present invention, a battery pack includes: a plurality of secondary batteries, each including an electrode terminal having a cooling groove; a cooling pipe configured to pass a heat transfer medium therethrough, the cooling pipe being received in the cooling groove of each of the plurality of secondary batteries; and a bus bar electrically connecting the electrode terminals of adjacent secondary batteries of the plurality of secondary batteries.

The cooling groove may have a substantially straight shape and may be formed having a depth in a surface of the electrode terminal.

The bus bar may be bonded to the surface of the electrode terminal and may cover the cooling pipe.

The cooling pipe may be received in the cooling groove of each of the plurality of secondary batteries and integrated with the secondary batteries.

Each of the plurality of secondary batteries may include: an electrode assembly including a first electrode plate and a second electrode plate; the electrode terminal having the terminal including a first electrode terminal electrically connected to the first electrode plate of the electrode assembly and having a first cooling groove, and a second electrode terminal electrically connected to the second electrode plate of the electrode assembly and having a second cooling groove; a case receiving the electrode assembly therein and having an opening; and a cap plate from which the first and second terminals protrude, the cap plate sealing the opening of the case in which the electrode assembly is received.

The first cooling groove of the first electrode terminal may be formed in a surface of the first electrode terminal to have a first angle with respect to a lengthwise direction of the cap plate.

The second cooling groove of the second electrode terminal may be formed in a surface of the second electrode terminal to have a second angle with respect to the lengthwise direction of the cap plate.

The first and second cooling grooves may be substantially perpendicular to the lengthwise direction of the cap plate.

Each of the first and second cooling grooves may include two substantially straight grooves, and the two grooves may be substantially parallel to each other.

In the plurality of secondary batteries, the first cooling groove may extend in a same substantially straight line as the second cooling groove of the adjacent secondary battery, and the second cooling groove may extend in a same substantially straight line as the first cooling groove of another adjacent secondary battery of the plurality of secondary batteries.

The cooling pipe may include ring-shaped pipes respectively received in the first and second cooling grooves formed in the same substantially straight line in the plurality of secondary batteries; and a straight pipe connecting the ring-shaped pipes to each other, and the cooling pipe may be configured to pass the heat transfer medium therethrough to cool the first and second electrode terminals, and the ring-shaped pipes and the straight pipe may be integrated with each other.

Both sides facing each other of each of the ring-shaped pipes may be received in one of the first or second cooling grooves.

In the plurality of secondary batteries, the cooling pipe may be an integrated pipe received in the first and second cooling grooves extending in the same line.

The cooling pipe may have a "U" shape and may be received in the first and second cooling grooves extending in the same line to provide a circulation passage of the heat transfer medium to cool the first and second electrode terminals.

In the plurality of secondary batteries, the first electrode terminal of one of the adjacent secondary batteries may be electrically connected to the second electrode terminal of the other of the adjacent secondary batteries through the bus bar, and the second electrode terminal of the one of the adjacent secondary batteries may be electrically connected to the first electrode terminal of another adjacent secondary battery of the plurality of secondary batteries through another bus bar.

The first and second electrode terminals may be arranged to cross the second and first electrode terminals, respectively, of the adjacent secondary battery to form two terminal rows.

The cooling pipe may include two cooling pipes, and the two cooling pipes may be respectively received in the cooling grooves of the first and second electrode terminals in the same terminal row of the two terminal rows.

BRIEF DESCRIPTION OF THE DRAWINGS

The accompanying drawings are included to provide a further understanding of the present disclosure, and are incorporated in and constitute a part of this specification. The drawings illustrate some exemplary embodiments of the present disclosure and, together with the description, serve to explain aspects and principles of the present invention. In the drawings.

DETAILED DESCRIPTION

Figure 1A:
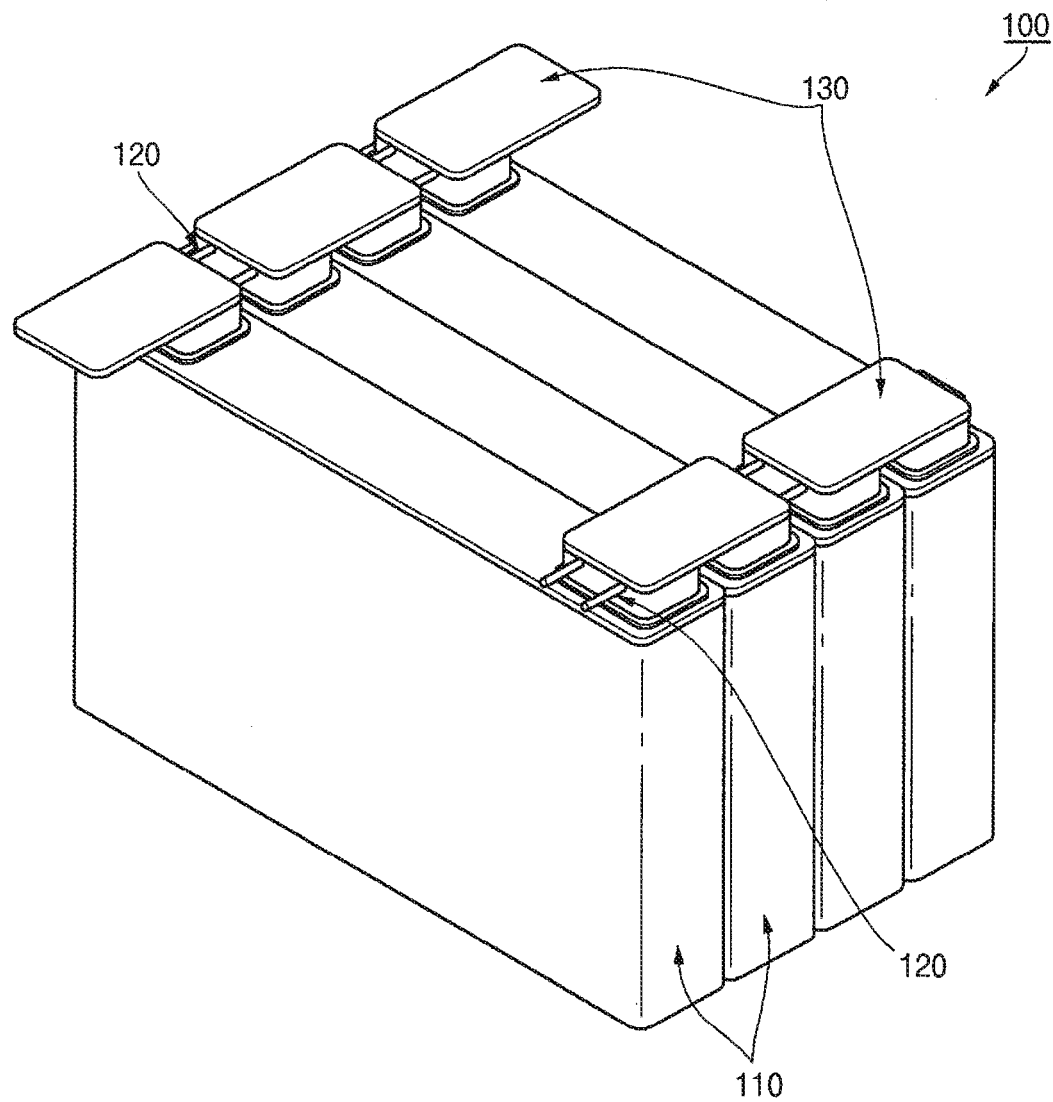
FIGS. 1A and 1B are perspective and partially exploded perspective views, respectively, of a battery pack according to an embodiment of the present invention.

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals denote like elements throughout.

Figure 1B:
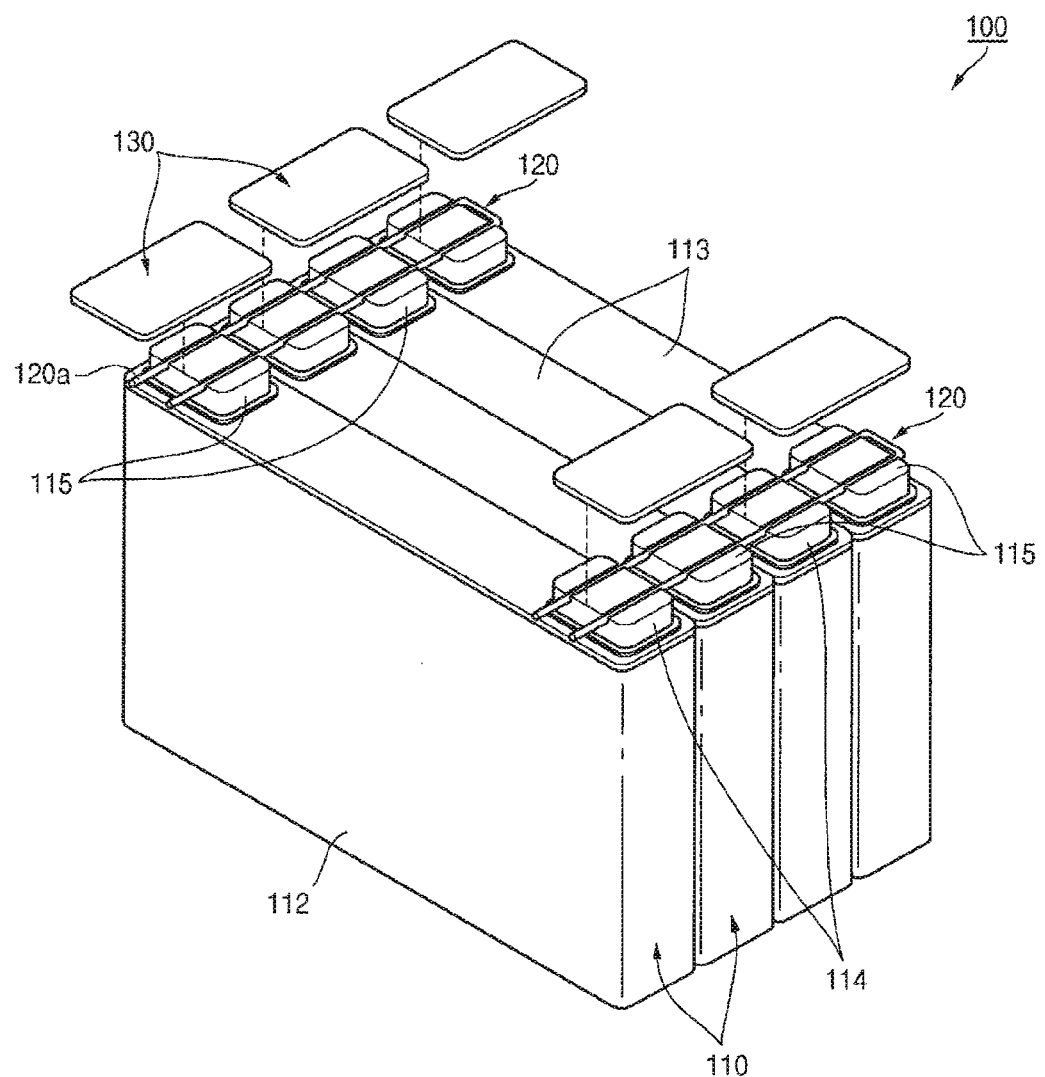
Figure 2:
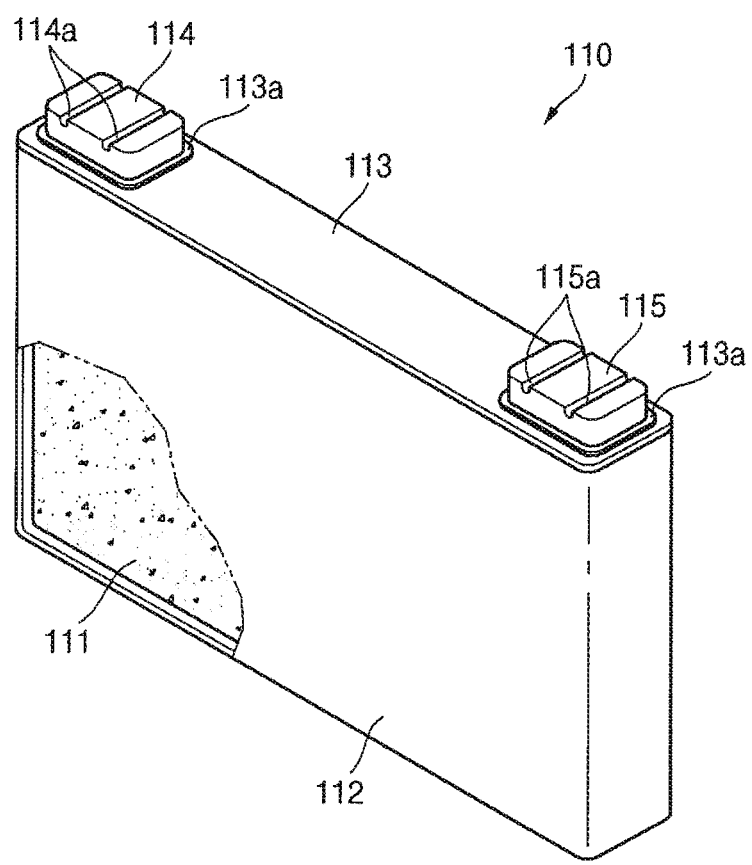
FIG. 2 is a perspective view of a secondary battery of the battery pack of FIGS. 1A and 1B.

FIGS. 1A and 1B are perspective and partially exploded perspective views, respectively, of a battery pack according to an embodiment of the present invention. FIG. 2 is a perspective view of a secondary battery of the battery pack of FIGS. 1A and 1B. The battery pack of FIGS. 1A and 1B is described below with reference to the secondary battery of FIG. 2.

Referring to FIGS. 1A and 1B, a battery pack 100 includes a plurality of secondary batteries 110, a cooling pipe 120, and one or more bus bars 130. Although the battery pack 100 is illustrated in FIGS. 1A and 1B including four of the secondary batteries 110, the present invention is not limited thereto. For example, the number of the secondary batteries 110 may be varied according to a desired capacity and use of the battery pack 100.

Referring to FIG. 2A, in one embodiment, each of the secondary batteries 110 includes an electrode assembly 111 in which a first electrode plate and a second electrode plate are stacked or wound with a separator therebetween, a case 112 receiving the electrode assembly 111 therein and having an upper end opening, a cap plate 113 sealing the upper end opening of the case 112, and first and second electrode terminals 114 and 115 electrically connected to the first electrode plate and the second electrode plate, respectively, and protruding outward from the cap plate 113.

The electrode assembly 111 and electrolyte are received in the case 112. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as LiPF6 or LiBF4. The electrolyte may be a liquid, solid, or gel.

The case 112 may be formed of a conductive metal, such as aluminum, aluminum alloy, or steel plated with nickel. The case 112, in one embodiment, may have a hexahedral shape in which the electrode assembly 111 is housed in an inner space thereof, or any other suitable shape.

The cap plate 113 is coupled to the case 112 to cover the upper end opening of the case 112 after the electrode assembly 111 is contained in the inner space of the case 112. In one embodiment, holes through which the first and second electrode terminals 114 and 115 protrude upward from the cap plate 113 are defined in the cap plate 113. A gasket 113a may be disposed between each of the holes of the cap plate 113 and the respective first and second electrode terminals 114 and 115.

In one embodiment, the first electrode terminal 114 is electrically connected to the first electrode plate of the electrode assembly 111, and the second electrode terminal 115 is electrically connected to the second electrode plate of the electrode assembly 111. The first and second electrode terminals 114 and 115 may be electrode terminals which have polarities different from each other.

In one embodiment, each of the first and second electrode terminals 114 and 115 may have a square pillar shape. Also, the first and second electrode terminals 114 and 115 may protrude with a same height. The first and second electrode terminals 114 and 115 of the secondary battery may protrude upward from the cap plate 113 in a state in which the first and second electrode terminals 114 and 115 are spaced apart from each other by a distance (e.g., a predetermined distance).

Each of the first and second electrode terminals 114 and 115 may protrude upward from the cap plate 113 through the respective gasket 113a of the cap plate 113. The gasket 113a may be formed of an insulative material. Thus, the first and second electrode terminals 114 and 115 may be electrically insulated from the cap plate 113.

The electrode terminals 114 and 115 have cooling grooves 114a and 115a, each having a depth (e.g., a predetermined depth) from a top surface thereof, respectively. The cooling grooves 114a and 115a, in one embodiment, include a first cooling groove 114a defined in the first electrode terminal 114, and a second cooling groove 115a defined in the second electrode terminal 115.

In one embodiment, each of the first and second cooling grooves 114a and 115a may be a straight or substantially straight groove having an angle (e.g., a predetermined angle) with respect to a lengthwise direction of the cap plate 113. The first and second cooling grooves 114a and 115a are defined in the first and second electrode terminals 114 and 115, respectively. In one embodiment, the first and second cooling grooves 114a and 115a may be perpendicular or substantially perpendicular to the lengthwise direction of the cap plate 113. In one embodiment, the first and second cooling grooves 114a and 115a may be symmetric to each other with respect to a center of the cap plate 113 along the lengthwise direction.

In one embodiment, the first cooling groove 114a passes between one surface and the other surface of the first electrode terminal 114 parallel or substantially parallel to the lengthwise direction of the cap plate 113. That is, the first cooling groove 114a may extend from the one surface of the first electrode terminal 114 to an opposite surface of the first electrode terminal 114 in a direction crossing (e.g., perpendicular to) the lengthwise direction of the cap plate 113. In one embodiment, the first cooling groove 114a may include two grooves, each having a straight or substantially straight shape. The two grooves may be defined in a top surface of the first electrode terminal 114 parallel or substantially parallel to each other. In another embodiment, each of the first and second cooling grooves 114a and 115a may be provided as one groove.

In one embodiment, the second cooling groove 115a may have the same shape as that of the first cooling groove 114a. The second cooling groove 115a may be defined between one surface and the other surface of the second electrode terminal 115 parallel or substantially parallel to the lengthwise direction of the cap plate 113 to pass through the second electrode terminal 115. That is, the second cooling groove 115a may extend from the one surface of the second electrode terminal 115 to an opposite surface of the second electrode terminal 115 in a direction crossing (e.g., perpendicular to) the lengthwise direction of the cap plate 113. In one embodiment, the second cooling groove 115a may include two grooves, each having a straight or substantially straight shape. The two grooves may be defined in a top surface of the second electrode terminal 115 parallel or substantially parallel to each other.

The plurality of secondary batteries 110 having a same or similar structure are arranged so that side surfaces of the secondary batteries 110 in a lengthwise direction face each other in a state in which the electrode terminals 114 and 115 face an upper side. Each of the side surfaces of each of the secondary batteries 110 in the lengthwise direction may be a surface having a relatively wide area of the side surfaces of the secondary battery 110 when a surface on which the electrode terminals 114 and 115 is defined as a top surface. That is, the relatively wide side surfaces of the secondary batteries 110 may be arranged to face each other.

In the plurality of secondary batteries 110, the first and second electrode terminals 114 and 115 are alternately arranged on both sides of the secondary batteries 110 with respect to a center of the lengthwise direction of the cap plate 113. The lengthwise direction of the cap plate 113 may be a direction in which the cap plate 113 has a relatively long length.

The first and second electrode terminals 114 and 115 of each of the plurality of secondary batteries 110 and the first and second electrode terminals 114 and 115 of the adjacent secondary battery 110 are alternately arranged to cross each other, thereby forming terminal rows. Each of the terminal rows may be a line in which the terminals having polarities different from each other are arranged in the line. That is, the plurality of secondary batteries 110 are arranged to form two terminal rows. In one embodiment, the cooling grooves 114a and 115a of the first and second electrode terminals 114 and 115 of the same terminal row are arranged in the same straight line. In one embodiment, each of the cooling grooves 114a and 115a includes two grooves parallel to each other, and the cooling grooves 114a and 115a in the same terminal row are arranged in two straight lines parallel to each other.

In the battery pack 100 according to one embodiment, the cooling pipe 120 may be an integrated pipe received in each of the cooling grooves 114a and 115a which are defined in the same straight line. In one embodiment, two cooling pipes 120 may be provided. Here, the two cooling pipes 120 may be received in the cooling grooves 114a and 115a of the first and second electrode terminals 114 and 115 arranged in the same terminal row of the two terminal rows, respectively.

The cooling pipe 120 may be a circulation passage of a heat transfer medium, such as a coolant for cooling the plurality of secondary batteries 110. In one embodiment, the cooling pipe 120 may have a "U" shape. The two sides of the cooling pipe 120 having the "U" shape may be received in the cooling groove defined in two straight lines within the same terminal row, respectively. The cooling pipe 120 may have an end 120a connected to a circulation pump (not shown), and the heat transfer medium may be circulated through the inside of the cooling pipe 120 by the circulation pump.

The cooling pipe 120 may include at least one of a plastic pipe, an insulated pipe, or a conductive pipe having high thermal conductivity coated with an insulative material on an outer surface thereof. Since the cooling pipe 120 having the high thermal conductivity can directly cool the first and second electrode terminals 114 and 115 of the plurality of secondary batteries 110 by the coolant circulated in the cooling pipe 120, thermal performance may be improved when a high-output reaction occurs. As described above, since the cooling pipe 120 is disposed in the electrode terminals 114 and 115 to directly cool the first and second electrode terminals 114 and 115, thermal deformation may be reduced and durability may be improved.

In one embodiment, the bus bar 130 is bonded to the top surfaces of the first and second electrode terminals 114 and 115 to cover the first and second electrode terminals 114 and 115 in which the cooling pipe 120 is received in the cooling grooves 114a and 115a. The bus bar 130 may have a plate structure having a generally rectangular shape or a plate structure having a generally bar shape.

The bus bar 130 electrically connects the first electrode terminals 114 of the plurality of secondary batteries 110 to the second electrode terminal 115 of the adjacent secondary battery 10 arranged in the same terminal row. Also, the bus bar 130 electrically connects the second electrode terminals 115 of the plurality of secondary batteries 110 to the first electrode terminal 114 of the adjacent secondary battery 110 arranged in the same terminal row.

In one embodiment, the bus bar 130 may be welded to the top surfaces of the first and second electrode terminals 114 and 115 such that the first and second electrode terminals 114 and 115 of the plurality of secondary batteries 110 are disposed to cross the electrode terminals 114 and 115 of the adjacent secondary battery 110. Here, the bus bar 130 having the plate structure may have a flat surface welded to the top surfaces of the first and second electrode terminals 114 and 115. That is, the plurality of secondary batteries 110 may be connected to each other in series by one or more of the bus bars 130 to form the battery pack 100 having high capacity.

Figure 3:
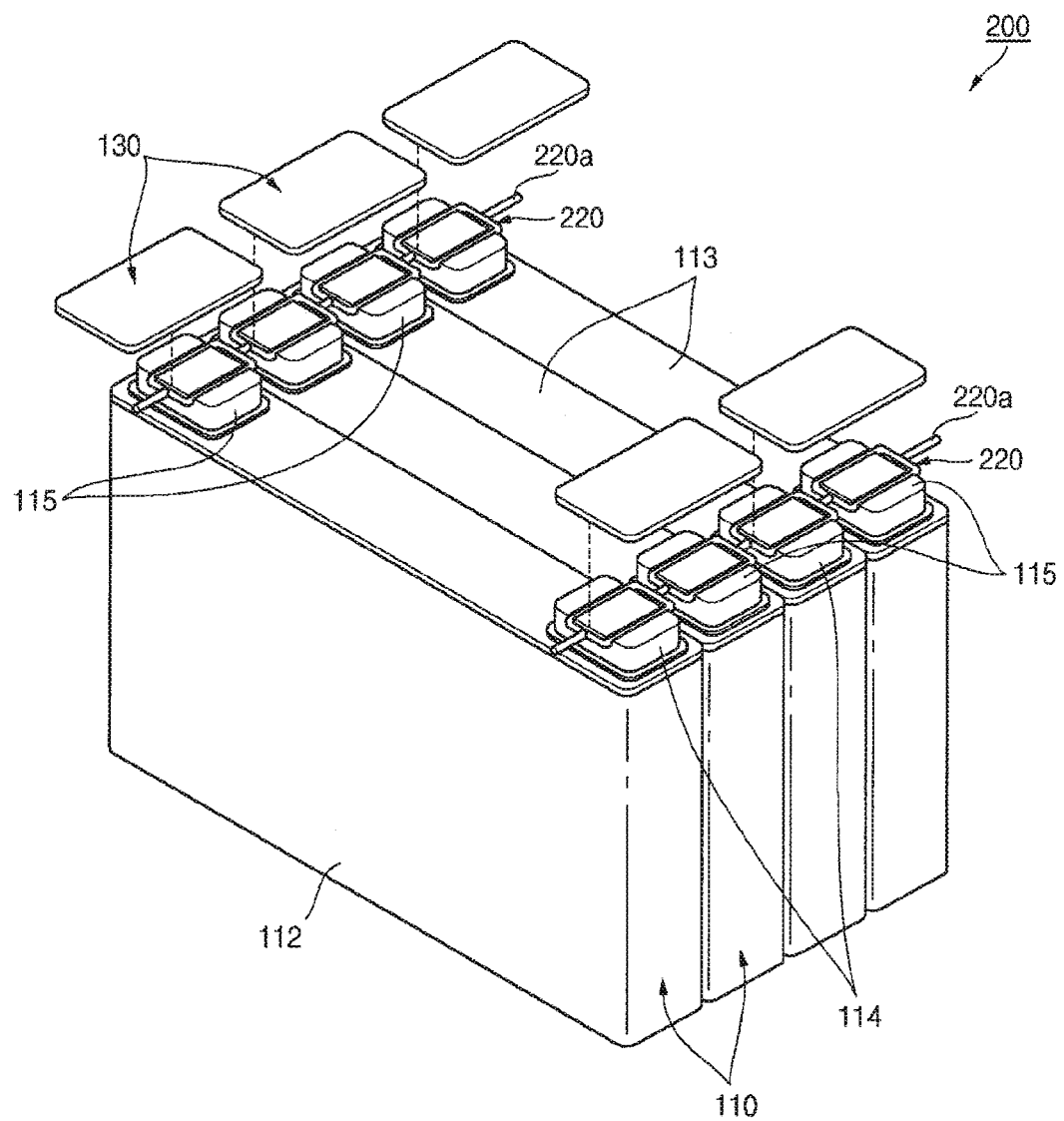
FIG. 3 is a partially exploded perspective view of a battery pack according to another embodiment of the present invention.

FIG. 3 is a partially exploded perspective view of a battery pack according to another embodiment of the present invention.

Figure 4:
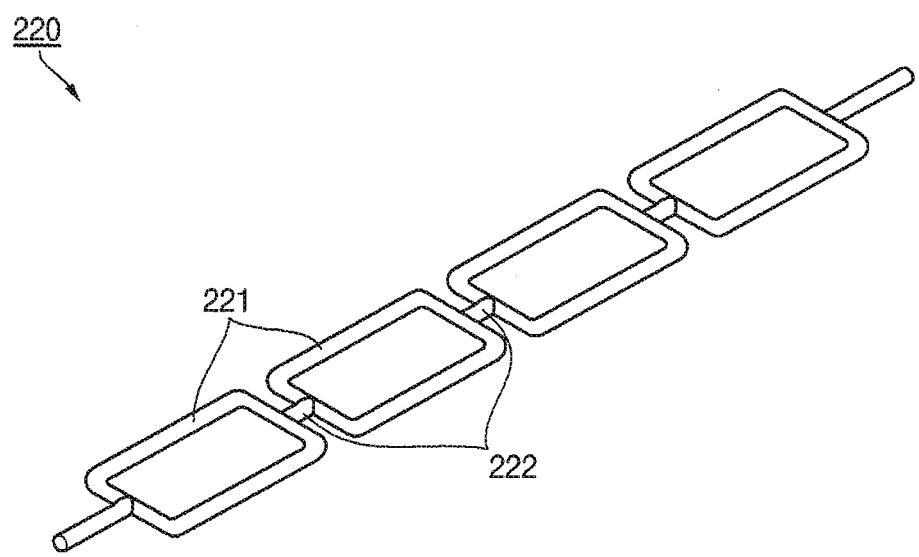
FIG. 4 is an enlarged view of a cooling pipe of the battery pack of FIG. 3.

Referring to FIG. 3, a plurality of the secondary batteries 110 and one or more of the bus bars 130 of a battery pack 200 may have the same or similar structure as those of the battery pack 100 described above with respect to FIGS. 1A and 1B. FIG. 4 is an enlarged view of a cooling pipe of the battery pack 200 of FIG. 3 that is different from the cooling pipe 120 of the battery pack 100 described above with respect to FIGS. 1A and 1B. A cooling pipe 220 of the battery pack 200 different from the cooling pipe 120 of the battery pack 100 is described below with reference to FIGS. 3 and 4.

The cooling pipe 220 according to an embodiment of the present invention includes ring-shaped pipes 221 (e.g., square ring-shaped pipes) and straight pipes 222. The ring-shaped pipes 221 are received in each of cooling grooves 114a and 115a defined in the first and second electrode terminals 114 and 115. The straight pipes 222 connect the adjacent ring-shaped pipes 221 to each other. That is, the straight pipes 222 connect the ring-shaped pipes 221 received in the cooling grooves 114a and 115a of the first and second electrode terminals 114 and 115 of the same terminal row to each other.

The ring-shaped pipes 221 and the straight pipes 222, in one embodiment, are integrated with each other to provide a circulation passage of a heat transfer medium, such as a coolant for cooling the plurality of secondary batteries 110. The cooling pipe 220 may have an end 220a connected to a circulation pump (not shown), and the heat transfer medium may be circulated through the inside of the cooling pipe 220 by the circulation pump. In one embodiment, the cooling pipe 220 may be an integrated pipe received in the cooling grooves 114a and 115a defined in the same straight line in the plurality of secondary batteries 110. In one embodiment, two cooling pipes 220 may be provided. The two cooling pipes 220 may be received in the cooling grooves 114a and 115a of the first and second electrode terminals 114 and 115 of the same terminal row of the two terminal rows, respectively.

In one embodiment, the cooling pipe 220 may include at least one of a plastic pipe, an insulated pipe, or a conductive pipe having high thermal conductivity coated with an insulation material on an outer surface thereof. In one embodiment, the cooling pipe 220 having the high thermal conductivity can directly cool the first and second electrode terminals 114 and 115 of the plurality of secondary batteries 110 by the coolant circulated in the cooling pipe 220, and thermal performance may be improved when a high-output reaction occurs. As described above, since the cooling pipe 220 is disposed in the first and second electrode terminals 114 and 115 to directly cool the first and second electrode terminals 114 and 115, thermal deformation of the plurality of secondary batteries 110 may be reduced and durability may be improved.

In the battery pack according to embodiments of the present invention, since the cooling pipe is received in the electrode terminals to directly cool the electrode terminals, thermal performance may be improved, such as when a high-capacity reaction occurs.

Also, in the battery pack according to embodiments of the present invention, since the cooling pipe is received in the electrode terminals to directly cool the electrode terminals, thermal deformation may be reduced to improve durability.

While some exemplary embodiments have been disclosed herein, and although specific terms are employed, they are used and are to be interpreted in a generic and descriptive sense only and not for purposes of limitation. Accordingly, it will be understood by those of ordinary skill in the art that various changes in form and details may be made without departing from the spirit and scope of the present disclosure as set forth in the following claims and equivalents thereof.

What is claimed is:

1. A battery pack comprising:
a plurality of secondary batteries, each comprising an electrode terminal having a pillar shape and protruding through a cap plate of the secondary battery and having a cooling groove formed in a top surface thereof, the top surface generally parallel to and opposite the cap plate;
a cooling pipe configured to pass a heat transfer medium therethrough, the cooling pipe being received in the cooling groove of the electrode terminal of each of the plurality of secondary batteries, the cooling pipe covering a protruded portion of the electrode terminal; wherein the protruded portion protrudes through the cap plate of the secondary battery; and
a bus bar bonded to and electrically connecting the electrode terminals of adjacent secondary batteries of the plurality of secondary batteries at the respective top surfaces of the electrode terminals having the cooling grooves and covering the cooling pipe.

2. The battery pack as claimed in claim 1, wherein the cooling groove has a substantially straight shape and is formed having a depth in the top surface of the electrode terminal.

3. The battery pack as claimed in claim 1, wherein the cooling pipe is received in the cooling groove of each of the plurality of secondary batteries and integrated with the secondary batteries.

4. The battery pack as claimed in claim 1, wherein each of the plurality of secondary batteries comprises:
an electrode assembly comprising a first electrode plate and a second electrode plate;
the electrode terminal having the cooling groove including a first electrode terminal electrically connected to the first electrode plate of the electrode assembly and having a first cooling groove, and a second electrode terminal electrically connected to the second electrode plate of the electrode assembly and having a second cooling groove;
a case receiving the electrode assembly therein and having an opening; and
the cap plate from which the first and second terminals protrude, the cap plate sealing the opening of the case in which the electrode assembly is received.

5. The battery pack as claimed in claim 4, wherein the first cooling groove of the first electrode terminal is formed in a surface of the first electrode terminal to have a first angle with respect to a lengthwise direction of the cap plate.

6. The battery pack as claimed in claim 5, wherein the second cooling groove of the second electrode terminal is formed in a surface of the second electrode terminal to have a second angle with respect to the lengthwise direction of the cap plate.

7. The battery pack as claimed in claim 6, wherein the first and second cooling grooves are substantially perpendicular to the lengthwise direction of the cap plate.

8. The battery pack as claimed in claim 4, wherein each of the first and second cooling grooves comprises two substantially straight grooves, and the two grooves are substantially parallel to each other.

9. The battery pack as claimed in claim 8, wherein, in the plurality of secondary batteries,
the first cooling groove extends in a same substantially straight line as the second cooling groove of the adjacent secondary battery, and
the second cooling groove extends in a same substantially straight line as the first cooling groove of another adjacent secondary battery of the plurality of secondary batteries.

10. The battery pack as claimed in claim 9, wherein the cooling pipe comprises:
ring-shaped pipes respectively received in the first and second cooling grooves formed in the same substantially straight line in the plurality of secondary batteries; and
a straight pipe connecting the ring-shaped pipes to each other,
wherein the cooling pipe is configured to pass the heat transfer medium therethrough to cool the first and second electrode terminals, and
wherein the ring-shaped pipes and the straight pipe are integrated with each other.

11. The battery pack as claimed in claim 10, wherein both sides facing each other of each of the ring-shaped pipes are received in one of the first or second cooling grooves.

12. The battery pack as claimed in claim 9, wherein, in the plurality of secondary batteries, the cooling pipe is an integrated pipe received in the first and second cooling grooves extending in the same line.

13. The battery pack as claimed in claim 9, wherein the cooling pipe has a "U" shape and is received in the first and second cooling grooves extending in the same line to provide a circulation passage of the heat transfer medium to cool the first and second electrode terminals.

14. The battery pack as claimed in claim 4, wherein, in the plurality of secondary batteries, the first electrode terminal of one of the adjacent secondary batteries is electrically connected to the second electrode terminal of the other of the adjacent secondary batteries through the bus bar, and the second electrode terminal of the one of the adjacent secondary batteries is electrically connected to the first electrode terminal of another adjacent secondary battery of the plurality of secondary batteries through another bus bar.

15. The battery pack as claimed in claim 4, wherein the first and second electrode terminals are arranged to cross the second and first terminals, respectively, of the adjacent secondary battery to form two terminal rows.

16. The battery pack as claimed in claim 15, wherein the cooling pipe includes two cooling pipes, and the two cooling pipes are respectively received in the cooling grooves of the first and second electrode terminals in the same terminal row of the two terminal rows.

* * * * *